United States Patent
Masuda

(10) Patent No.: US 9,465,949 B2
(45) Date of Patent: Oct. 11, 2016

(54) INFORMATION PROCESSING APPARATUS EXECUTING PRINT PREVIEW ACCORDING TO DIFFERENT MODES, AND RECORDING MEDIUM

(71) Applicant: KONICA MINOLTA, INC., Chiyoda-ku (JP)

(72) Inventor: Tetsuya Masuda, Nishinomiya (JP)

(73) Assignee: KONICA MINOLTA, INC., Chiyoda-Ku, Tokyo (JP)

(*) Notice: Subject to any disclaimer, the term of this patent is extended or adjusted under 35 U.S.C. 154(b) by 0 days.

(21) Appl. No.: 14/291,057

(22) Filed: May 30, 2014

(65) Prior Publication Data

US 2014/0368861 A1  Dec. 18, 2014

(30) Foreign Application Priority Data

Jun. 18, 2013 (JP) ................................. 2013-127634

(51) Int. Cl.
*G06K 15/00* (2006.01)
*G06F 21/60* (2013.01)

(52) U.S. Cl.
CPC ..... *G06F 21/608* (2013.01); *G06F 2221/2105* (2013.01); *G06F 2221/2145* (2013.01)

(58) Field of Classification Search
CPC combination set(s) only.
See application file for complete search history.

(56) References Cited

U.S. PATENT DOCUMENTS

| | | | | |
|---|---|---|---|---|
| 2005/0073709 A1* | 4/2005 | Kujirai | ................ | G06F 3/1222 358/1.14 |
| 2007/0081189 A1* | 4/2007 | Kamei | ................ | G06F 21/6209 358/1.18 |
| 2007/0297029 A1* | 12/2007 | Low | ...................... | G06F 17/212 358/527 |
| 2008/0151288 A1* | 6/2008 | Matsunoshita | .............. | 358/1.15 |
| 2010/0060941 A1* | 3/2010 | Zhang | ................ | H04N 1/00233 358/3.28 |
| 2012/0105916 A1* | 5/2012 | Lee et al. | ...................... | 358/3.28 |
| 2012/0140278 A1 | 6/2012 | Sousa et al. | | |

FOREIGN PATENT DOCUMENTS

| | | |
|---|---|---|
| JP | 2008-129941 A | 6/2008 |
| JP | 2008-234120 A | 10/2008 |
| JP | 2012-123557 A | 6/2012 |

* cited by examiner

*Primary Examiner* — Marivelisse Santiago Cordero
*Assistant Examiner* — Kevin Ky
(74) *Attorney, Agent, or Firm* — Buchanan Ingersoll & Rooney PC

(57) ABSTRACT

An information processing apparatus includes: a first acquisition unit that acquires, as a first mode, a security mode of a first execution process regarding a print preview application called from a first application; a second acquisition unit that acquires a security mode of a printer driver as a second mode, when a print preview is executed through the printer driver, based on a print preview instruction given in a second application; a determination unit that determines identity of security levels regarding both the modes of the first mode and the second mode; and an operation control unit that, when the security levels of both the modes are different from each other, activates a second execution process which is different from the first execution process and is an execution process of the print preview application, to execute the print preview.

13 Claims, 15 Drawing Sheets

Fig.10

| SECURITY MODE | SECURITY LEVEL | CONSISTENT ACCESS LEVEL | GIVEN AUTHORITY |
|---|---|---|---|
| NORMAL MODE (UNPROTECTED MODE) | LOW | HIGH | ADMINISTRATOR AUTHORITY |
| | MEDIUM | MEDIUM | USER AUTHORITY |
| PROTECTED MODE | HIGH | LOW | LOW-RELIABILITY AUTHORITY |

INFORMATION PROCESSING APPARATUS EXECUTING PRINT PREVIEW ACCORDING TO DIFFERENT MODES, AND RECORDING MEDIUM

This application is based on Japanese Patent Application No. 2013-127634 filed on Jun. 18, 2013, the contents of which are hereby incorporated by reference.

BACKGROUND OF THE INVENTION

1. Field of the Invention

The present invention relates to an information processing apparatus such as a personal computer, and particularly to a display technique in an information processing apparatus.

2. Description of the Background Art

There exists a technique of displaying an image indicating a finishing state of a printed matter (a print preview technique) (e.g., refer to Japanese Patent Application Laid-Open No. 2012-123557). Specifically, in certain application software (simply referred to as an application as well) (e.g., document creation software, spreadsheet software, a web browser, and the like), when a print instruction is given, printer driver software (referred to as a printer driver as well) is activated. In response to further operation or the like, a print preview application (display application) is called from the printer driver, to be activated, and a print preview is displayed in the print preview application.

Moreover, a display screen (a print preview screen) of the above-described print preview application can accept a new print preview instruction while remaining displayed on a display unit of a computer, based on the print preview instruction without being closed. In the print preview screen remaining activated, a print preview in response to the new print preview instruction is displayed.

For example, the print preview application (particularly, the print preview screen thereof) displaying the print preview, based on the print instruction from the document creation software can display a new print preview, based on a new print preview instruction from another application software (a web browser or the like). Displaying the new print preview using the print preview application remaining activated can shorten time required for displaying the print preview from the print preview instruction, as compared with a case where the print preview application is reactivated. Mutually giving and receiving of data (including the print instruction and the like) between various applications executed as different processes (e.g., between the printer driver and the print preview application) are performed using interprocess communication technology.

Moreover, in a specific application (e.g., a web browser), a high security mode (e.g., a "protected mode" or the like employed in a Windows OS such as Windows Vista or later) that prevents an illegal access from outside can be set. When the high security mode is set in the web browser, authority is largely limited in order to prevent attack from outside. Moreover, a process activated from the web browser also operates in the high security mode, and authority of the process is also largely limited.

If a specific security mode (a "protected mode" or the like) and another security mode (a "normal mode" or the like) coexist in the above-described print preview technology, the following problem may occur.

For example, when a certain application (document creation software or the like) is executed in the normal mode (an unprotected mode), a print preview application is activated through a printer driver in response to a preview instruction from the application, and a print preview screen is displayed. Subsequently, a print preview instruction from a web browser may be given to the print preview application in a state where the print preview is displayed.

In this situation, when the web browser is activated in the "protected mode", and the printer driver is activated from the web browser, the printer driver activated from the web browser takes over the security mode (the "protected mode") of the web browser and operates in the "protected mode". In response to the print preview instruction from an operator, the printer driver tries to transmit, to the print preview application already activated (running), a print preview instruction to display a print preview regarding the browser.

However, when the running print preview application operates in the normal security mode (the unprotected mode), inconsistency is caused between the security mode of the running print preview application (the unprotected mode) and the security mode of the printer driver based on the new print preview instruction (the protected mode). Thus, there arises a problem that the print preview application cannot normally execute the new operation instruction (the print preview instruction) from the printer driver. Although displaying the abnormal state in an error message enables an occurrence of the abnormal state to be notified to the operator, there is also a problem that the operator is requested to perform another activation operation of the print preview application.

SUMMARY OF THE INVENTION

An object of this invention is to provide a technique enabling a display application to be shared with ease, even if security modes of a plurality of applications are different from one another, when the plurality of applications share the display application.

According to a first aspect of the present invention, there is provided an information processing apparatus including a first acquisition unit that acquires, as a first mode, a security mode of a first execution process regarding a print preview application called from a first application, a second acquisition unit that acquires a security mode of a printer driver as a second mode, when a print preview is executed through the printer driver, based on a print preview instruction given in a second application, a determination unit that determines identity of security levels regarding both the modes of the first mode and the second mode, and an operation control unit that, when the security levels of both the modes are different from each other, activates a second execution process which is different from the first execution process and is an execution process of the print preview application, to execute the print preview.

According to a second aspect of the present invention, there is provided a non-transitory computer-readable recording medium having recorded thereon a printer driver, to cause a computer to execute the steps of a) acquiring, as a first mode, a security mode of a first execution process regarding a print preview application called from a first application, b) acquiring a security mode of the printer driver as a second mode, when a print preview is executed through the printer driver, based on a print preview instruction given in a second application, c) determining identity of security levels regarding both the modes of the first mode and the second mode, and d) activating a second execution process which is different from the first execution process and is an execution process of the print preview application, to execute the print preview using the second execution process, when the security levels of both the modes are different from each other.

According to a third aspect of the present invention, there is provided an information processing apparatus including a first acquisition unit that acquires, as a first mode, a security mode of a first execution process regarding a print preview application called from a first application, a second acquisition unit that acquires a security mode of a printer driver as a second mode, when a print preview is executed through the printer driver, based on a print preview instruction given in a second application, a determination unit that determines identity of security levels regarding both the modes of the first mode and the second mode, and an operation control unit that, when the security levels of both the modes are different from each other, changes the security mode of the first execution process from the first mode to the second mode, to execute the print preview using the first execution process whose security mode is changed to the second mode.

According to a fourth aspect of the present invention, there is provided an information processing apparatus including a first acquisition unit that acquires, as a first mode, a security mode of a first execution process regarding a display application taking over the security mode of a first application and activated, a second acquisition unit that acquires a security mode of a second application as a second mode, before an operation instruction to execute display operation in the display application is given, based on a display instruction in the second application, a determination unit that determines identity of security levels regarding both the modes of the first mode and the second mode, and an operation control unit that, when the security levels of both the modes are different from each other, activates a second execution process which is different from the first execution process and is an execution process of the display application, to execute the display operation based on the operation instruction.

According to a fifth aspect of the present invention, there is provided an information processing apparatus including a first acquisition unit that acquires, as a first mode, a security mode of a first execution process regarding a display application taking over the security mode of a first application and activated, a second acquisition unit that acquires a security mode of a second application as a second mode, before an operation instruction to execute display operation in the display application is given, based on a display instruction in the second application, a determination unit that determines identity of security levels regarding both the modes of the first mode and the second mode, and an operation control unit that, when the security levels of both the modes are different from each other changes the security mode of the first execution process to the second mode, to execute the display operation based on the operation instruction using the first execution process whose security mode is changed to the second mode.

These and other objects, features, aspects and advantages of the present invention will become more apparent from the following detailed description of the present invention when taken in conjunction with the accompanying drawings.

BRIEF DESCRIPTION OF THE DRAWINGS

FIG. 10 is a diagram showing security modes.

DESCRIPTION OF THE PREFERRED EMBODIMENTS

Hereinafter, embodiments of the present invention will be described with reference to the drawings.

<1. First Embodiment>
<1-1. System Outline>

Figure 1:
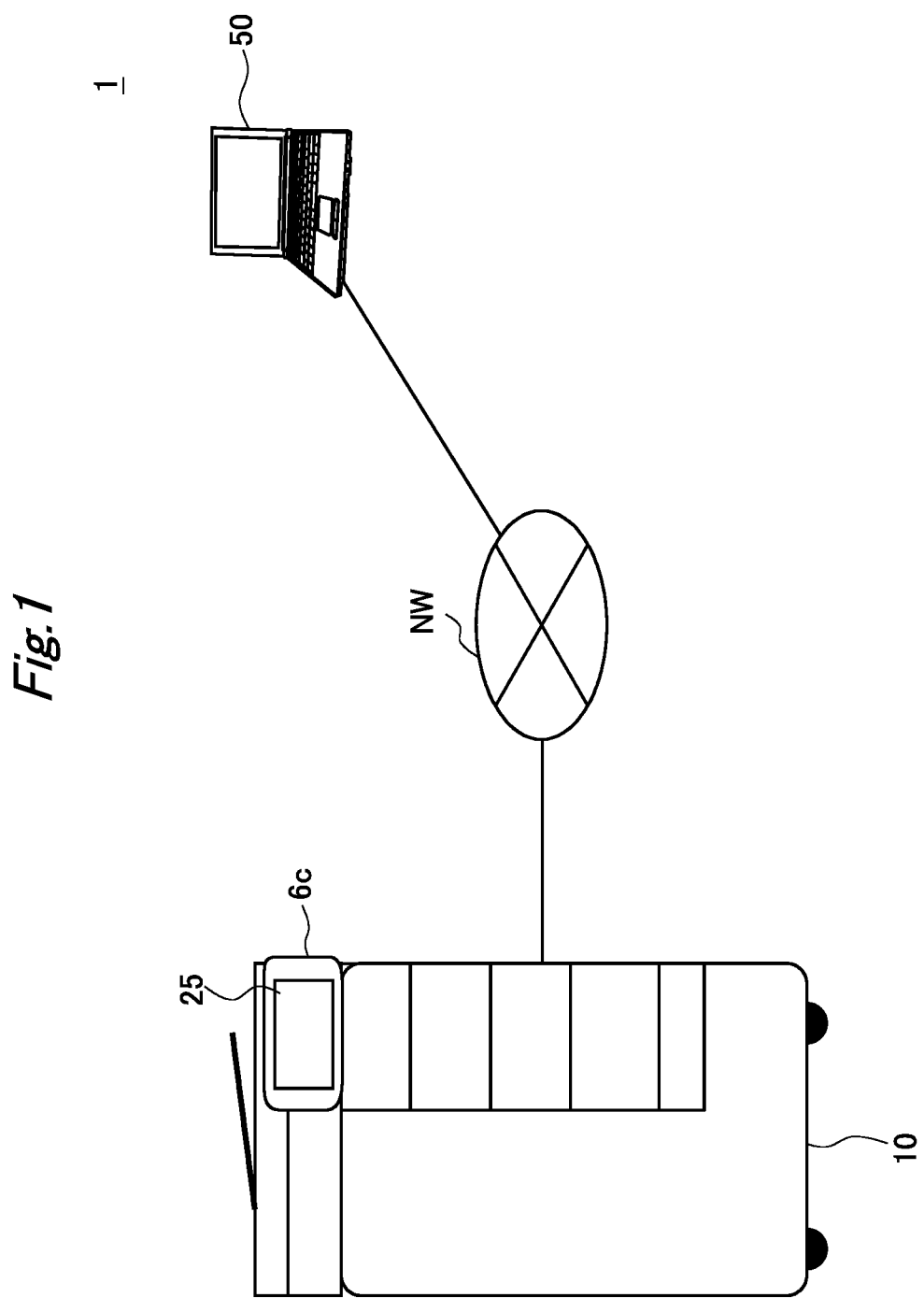
FIG. 1 is a diagram showing an image forming system.

FIG. 1 is a diagram showing an image forming system 1. As shown in FIG. 1, this image forming system 1 includes an image forming apparatus 10 and an image processing apparatus (referred to as a computer as well) 50.

The respective elements 10, 50 in the present system 1 are communicably connected to each other through a network NW. The network NW is configured by a LAN (Local Area Network) or the like. Moreover, a connection aspect with respect to the network NW may be a wired connection or may be wireless connection.

<1-2. Configuration of Image Forming Apparatus 10>

The image forming apparatus 10 has a network connection function (an internet connection function or the like). For example, the image forming apparatus 10 can execute print output, based on a print output instruction from the computer 50.

Figure 2:
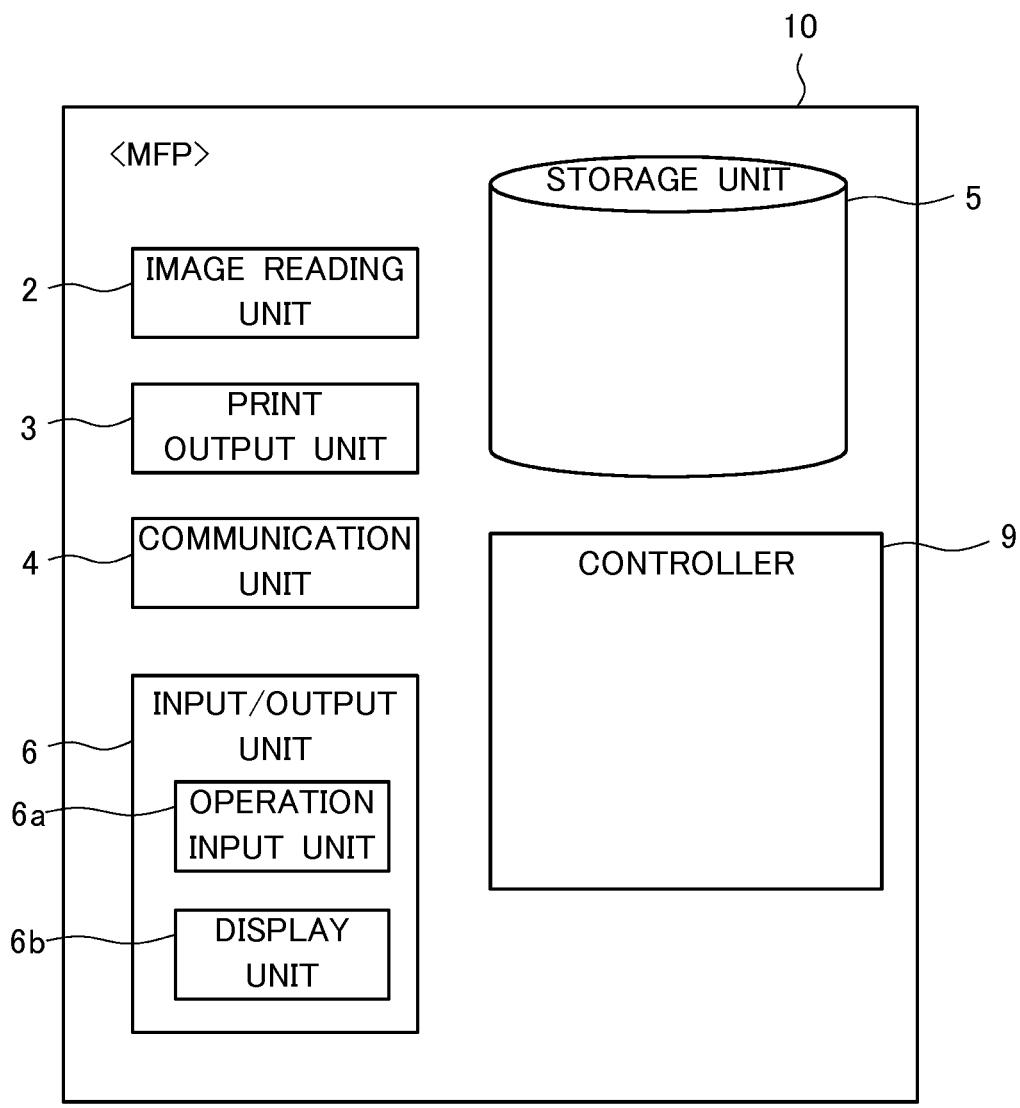
FIG. 2 is a diagram showing a functional block of an image forming apparatus.

FIG. 2 is a diagram showing a functional block of the image forming apparatus 10. Here, as the image forming apparatus 10, an MFP (Multi-Functional Peripheral) is exemplified.

The MFP 10 is an apparatus including a scanning function, a copy function, a facsimile function, a box storage function, and the like (referred to as a multifunction machine as well). Specifically, the MFP 10 includes an image reading unit 2, a print output unit 3, a communication unit 4, a storage unit 5, an operation unit 6, a controller 9 and the like, as shown in the functional block of FIG. 2, and operates these respective units in a multiple manner to implement the various functions.

The image reading unit 2 is a processing unit that optically reads (i.e., scans) a document placed at a predetermined position of the MFP 10 to generate image data of the document (referred to as a document image or a scanning image as well). This image reading unit 2 is also referred to as a scanning unit.

The print output unit 3 is an output unit that prints out an image on various media such as paper and the like, based on data regarding a print object. The image forming apparatus 10 is also referred to as a printer or a print output apparatus because it has a print output function. Similarly, the image forming system 1 is also referred to as a print system or a print output system.

The communication unit 4 has a facsimile communication unit 4a and a network communication unit 4b. The facsimile communication unit 4a is a processing unit capable of performing facsimile communication through public lines and the like. The network communication unit 4b is a processing unit capable of performing network communication through the network NW. In this network communication, various protocols such as TCP/IP (Transmission Control Protocol/Internet Protocol) and the like are used, for example. By using the network communication, the MFP 10 is able to receive or transmit various data from or to a desired target.

The storage unit 5 is configured by a storage device such as a hard disk drive (HDD) and the like. The storage unit 5 stores data related to a print job, and the like.

The operation unit 6 includes an operation input unit 6a that accepts input to the MFP 10, and a display unit 6b that performs display output of various types of information. In this MFP 10, a substantially plate-like operation panel unit 6c (refer to FIG. 1) is provided. Moreover, the operation panel unit 6c has a touch panel 25 (refer to FIG. 1) on a front side thereof. The touch panel 25 is configured by embedding piezoelectric sensors or the like in a liquid crystal display panel, and can display various types of information and accept operation input from an operator. For example, in the touch panel 25, a menu image (including button images and the like) is displayed. The operator presses a button (a button represented by the button image) virtually arranged in the touch panel 25, which enables the operator to set various operation contents of the image forming apparatus 10 and so on. The touch panel 25 functions as a part of the operation input unit 6a, and as a part of the display unit 6b as well.

Moreover, the controller 9 is a control device that is incorporated in the MFP 10 to comprehensively control the MFP 10.

<1-3. Configuration of Computer 50>

Figure 3:
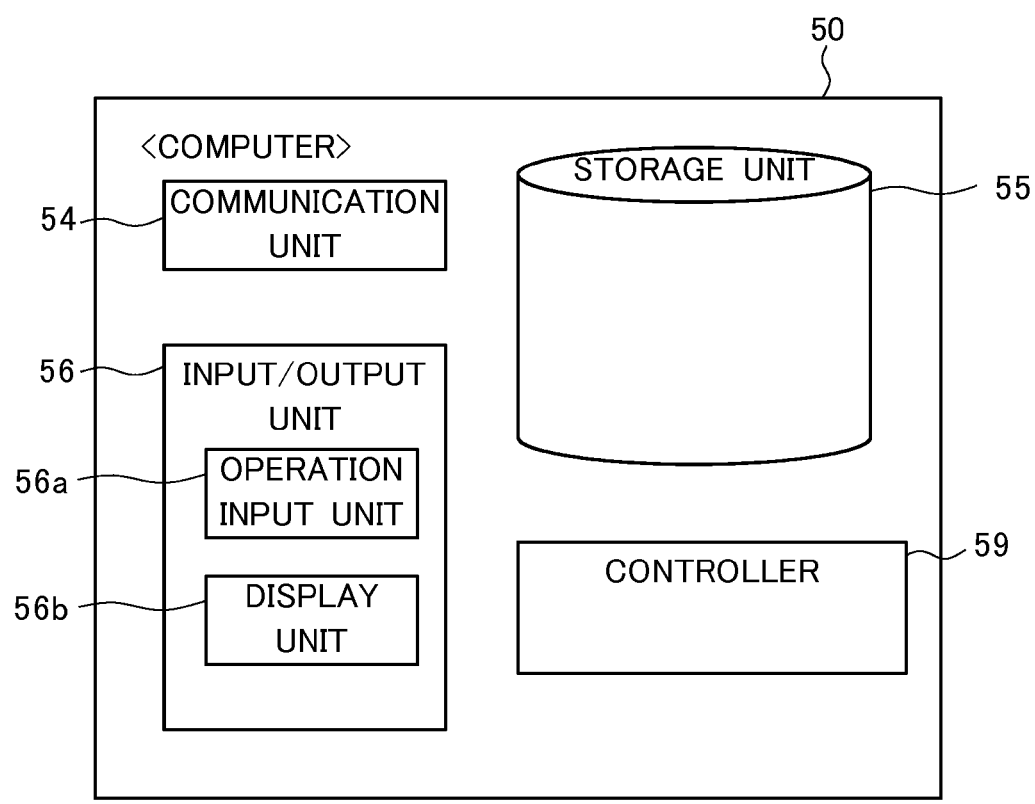
FIG. 3 is a diagram showing a functional block of a computer.

FIG. 3 is a diagram showing a functional block of the computer 50 (the information processing apparatus).

The computer 50 is configured as a so-called personal computer. The computer 50 includes a communication unit 54, a storage unit 55, an input/output unit 56, a controller 59 and the like, as shown in a functional block in FIG. 4, and operates these respective units in a multiple manner to implement various functions.

The communication unit 54 can perform network communication through the network NW. In this network communication, various protocols such as TCP/IP (Transmission Control Protocol/Internet Protocol) and the like are used, for example. By using the network communication, the MFP 10 is able to receive or transmit various data from or to a desired target.

The storage unit 55 is configured by a storage device such as a hard disk drive (HDD) and the like.

The input/output unit 56 includes an operation input unit 56a that accepts input to the computer 50, and a display unit 56b that performs display output of various types of information. As the operation input unit 56a, a keyboard, a mouse and the like are provided, and as the display unit 56b, a liquid crystal display monitor or the like is provided.

The controller 59 is a control device that is incorporated in the computer 50 to comprehensively control the computer 50. The controller 59 includes a CPU, various semiconductor memories (RAM and ROM) and the like. The controller 59 executes various software programs (simply referred to as programs as well) PG5 stored in the storage unit 55 to thereby implement the various processing units in the CPU. The programs PG5 are recorded on a portable recording medium (in other words, on various types of non-transitory computer-readable recording media) such as a CD-ROM and the like, and are installed on the computer 50 through the recording medium. Alternatively, the programs PG5 may be downloaded and installed on the computer 50 through the network NW or the like.

Figure 4:
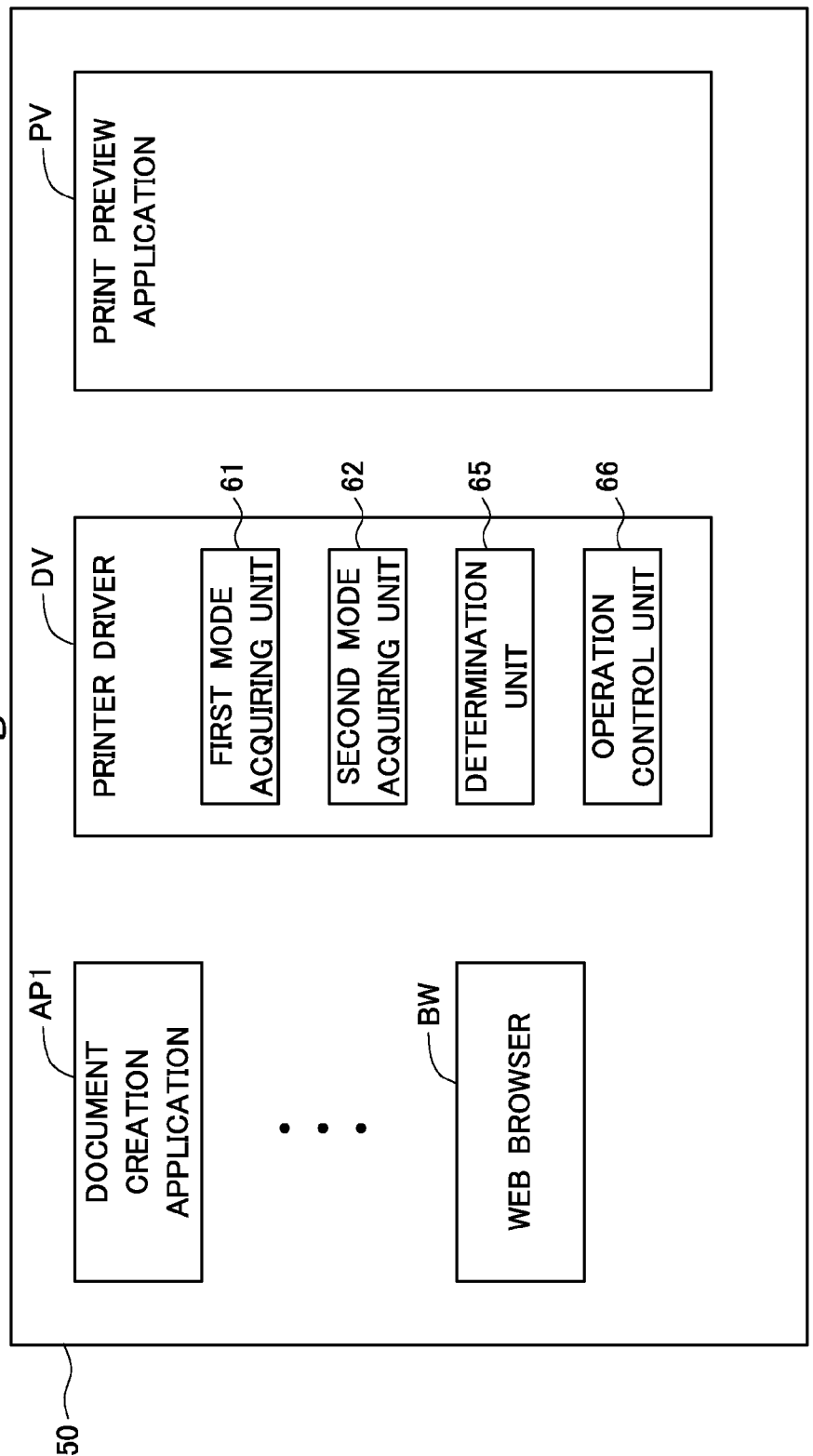
FIG. 4 is a diagram showing various programs executed in the computer.

FIG. 4 is a conceptual diagram showing the various programs PG5 executed in the computer 50.

As shown in FIG. 4, on the computer 50, various application software programs AP (e.g., document creation software AP1, spreadsheet software, a web browser BW and the like) are installed. Moreover, a printer driver program (simply referred to as a printer driver as well) DV, which controls print output operation in the image forming apparatus 10, is also installed as the program PG5. Moreover, a print preview application PV (a display application), which is called from the printer driver DV and executed, is also installed as the program PG5. The print preview application PV has a function of displaying a print preview screen VS (refer to FIG. 9), based on a print preview instruction transmitted from the various applications AP through the printer driver DV. For a printed matter using a watermark or the like stored only in the image forming apparatus (the print output apparatus) 10, this print preview application PV communicates with the image forming apparatus 10 to acquire information of the watermark and the like, by which a finishing state of the printed matter can be displayed in a state reflecting the watermark or the like.

Particularly, the printer driver DV is executed in the controller 59, by which a first mode acquiring unit 61, a second mode acquiring unit 62, a determination unit 65 and an operation control unit 66 and the like are implemented. Operation of these respective processing units will be described later.

<1-4. Security Mode>

In the computer 50, a security mode (an access authority level) can be set for each process of the applications. As the security mode, a mode having a normal security level (referred to as a "normal mode" as well), and a mode having a security level higher than the normal mode (a "protected mode") are selectively set. The "normal mode" is also referred to as a normal security mode, and the "protected mode" is also referred to as a high security mode.

FIG. 10 is a diagram for describing the above-described security modes.

The process operating in the "normal mode" (referred to as an unprotected mode as well) has normal authority in response to an execution source user (administrator user authority or normal user authority) of the process.

For example, a process executed by a user having the normal user authority can create and change a file inside a document folder of the user, and can freely perform writing in a registry area dedicated for the user (e.g., HKEY_CURRENT_USER). The above-described access control is also expressed as the control having a "medium" integrity access level, or having a "medium" security level.

Moreover, a process executed by a user having administrator authority (an administrative user) can freely create and change a file inside a folder (e.g., Program Files folder) other than the document folder of the administrative user, and can freely perform writing in an important registry area (e.g., HKEY_LOCAL_MACHINE). The above-described access control is also expressed as the control having a "high" integrity access level, or having a "low" security level.

Meanwhile, a process operating in the protected mode has only authority largely limited with respect to the file access and the registry access. Specifically, writing operation in only a part of folders (e.g., Temporary Internet Files¥ Low) is permitted with respect to the file access of the process (writing operation in other folders is not permitted). Moreover, writing operation in only a part of registries (e.g., HKEY_CURRENT_USER¥ Software¥ LowRegistry) is permitted with respect to the registry access by the process (writing operation in the other registries is not permitted). The above-described access control is also expressed as the control having a "low" integrity access level or having a "high" security level.

In this manner, the process operating in the protected mode (e.g., a web browser process operating in the protected mode) is given only relatively low access authority, which can prevent illegal operation from outside using the process.

Here, the security modes of other applications (child processes and grandchild processes) called from the respective applications AP (parent processes), to be activated are each set to either the "protected mode" or the "normal mode (the unprotected mode)". More particularly, the other applications (the child processes and the grandchild processes) called from the respective applications AP (the parent processes), to be activated each take over the security mode of the parent process. For example, when the security mode of the application AP (the parent process) is the "protected mode", the printer driver DV (the child process) called from the application AP (the parent process), to be activated takes over the security mode (the protected mode) of the application AP, and operates in the "protected mode". Moreover, the print preview application PV (the grandchild process) called from the printer driver DV (the child process), to be activated also takes over the security mode (the protected mode) of the printer driver DV (and the application AP) and operates in the "protected mode".

<1-5. Operation>

Figure 5:
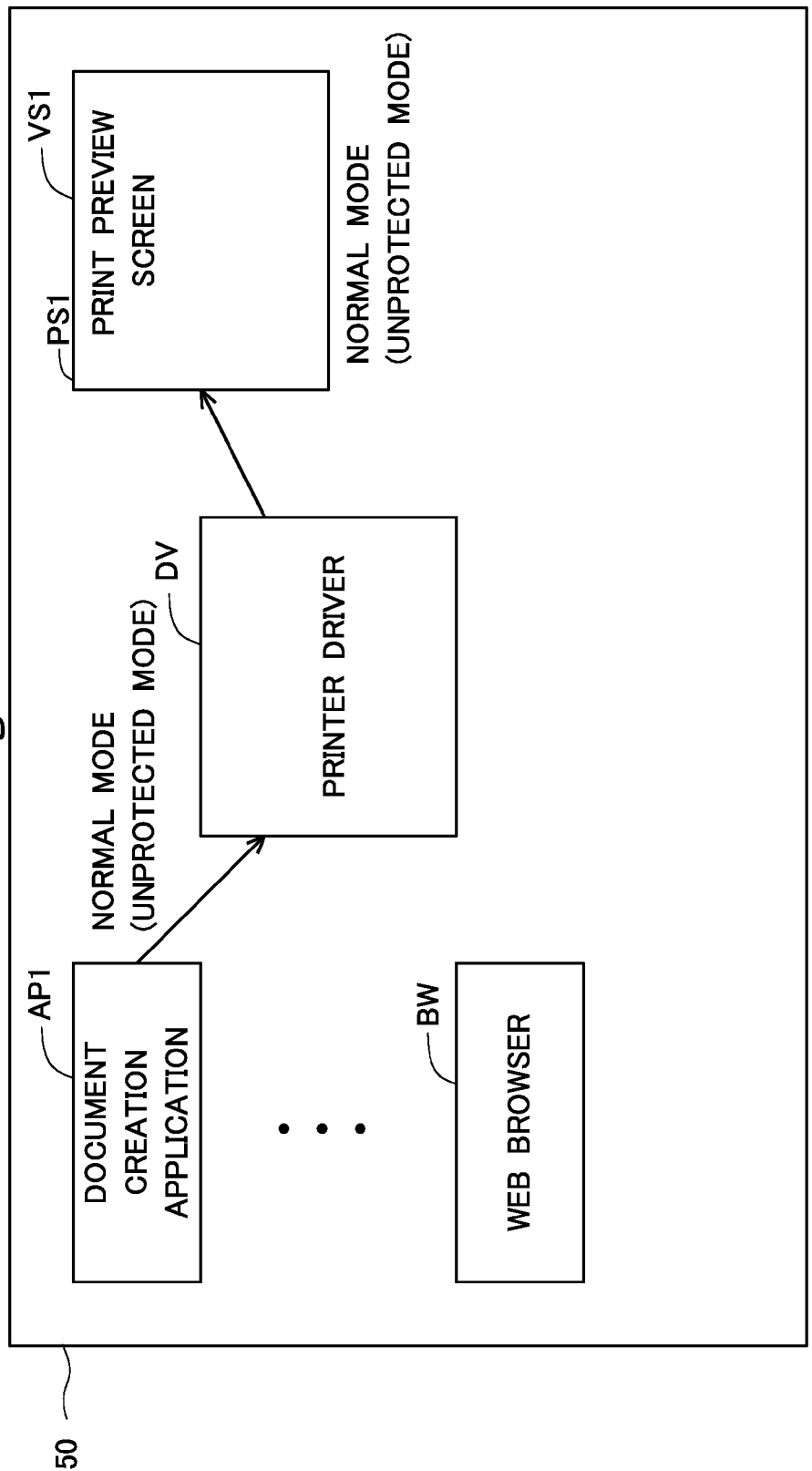
FIG. 5 is a diagram showing operation and the like of respective applications.
Figure 6:
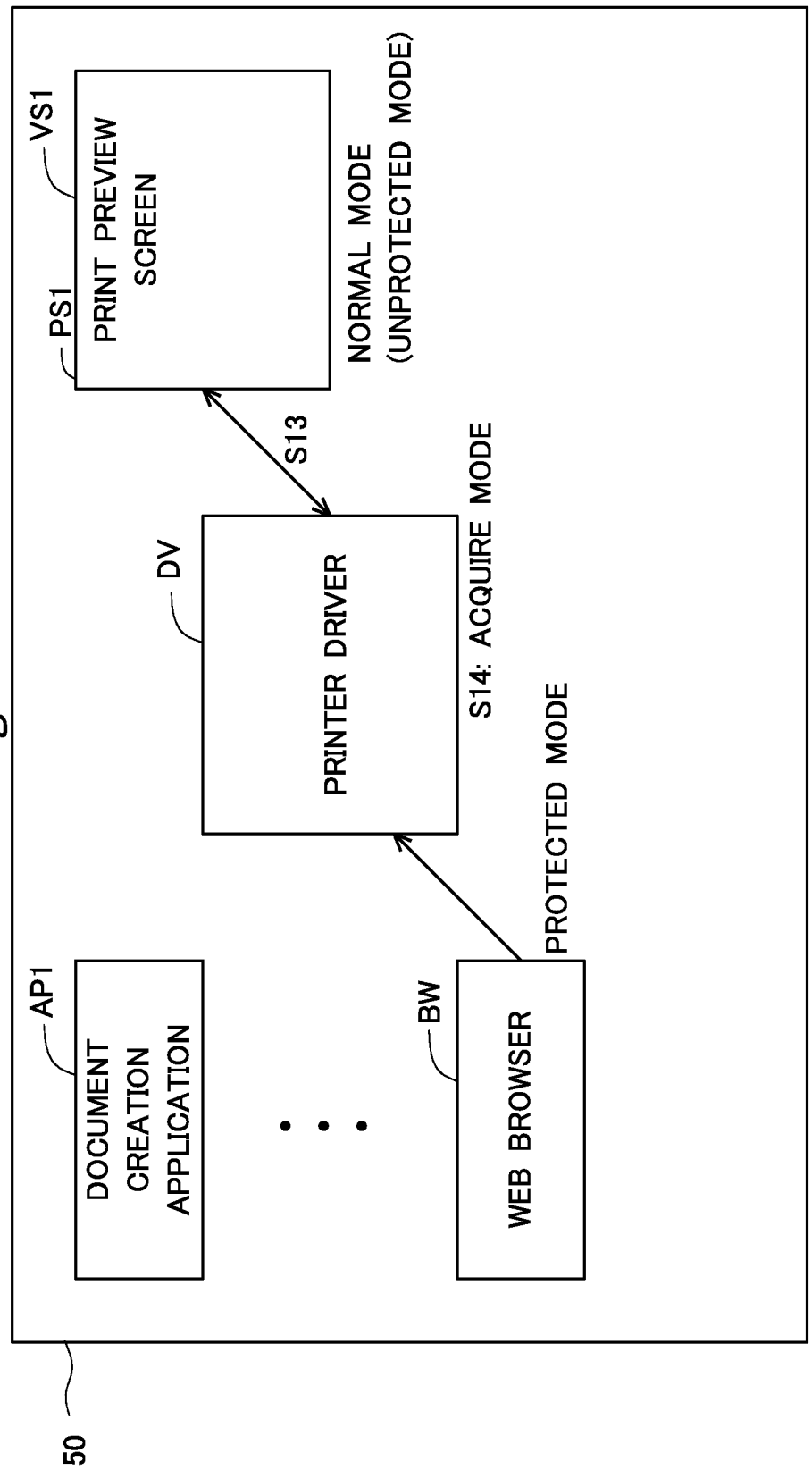
FIG. 6 is a diagram showing the operation and the like of the respective applications.
Figure 7:
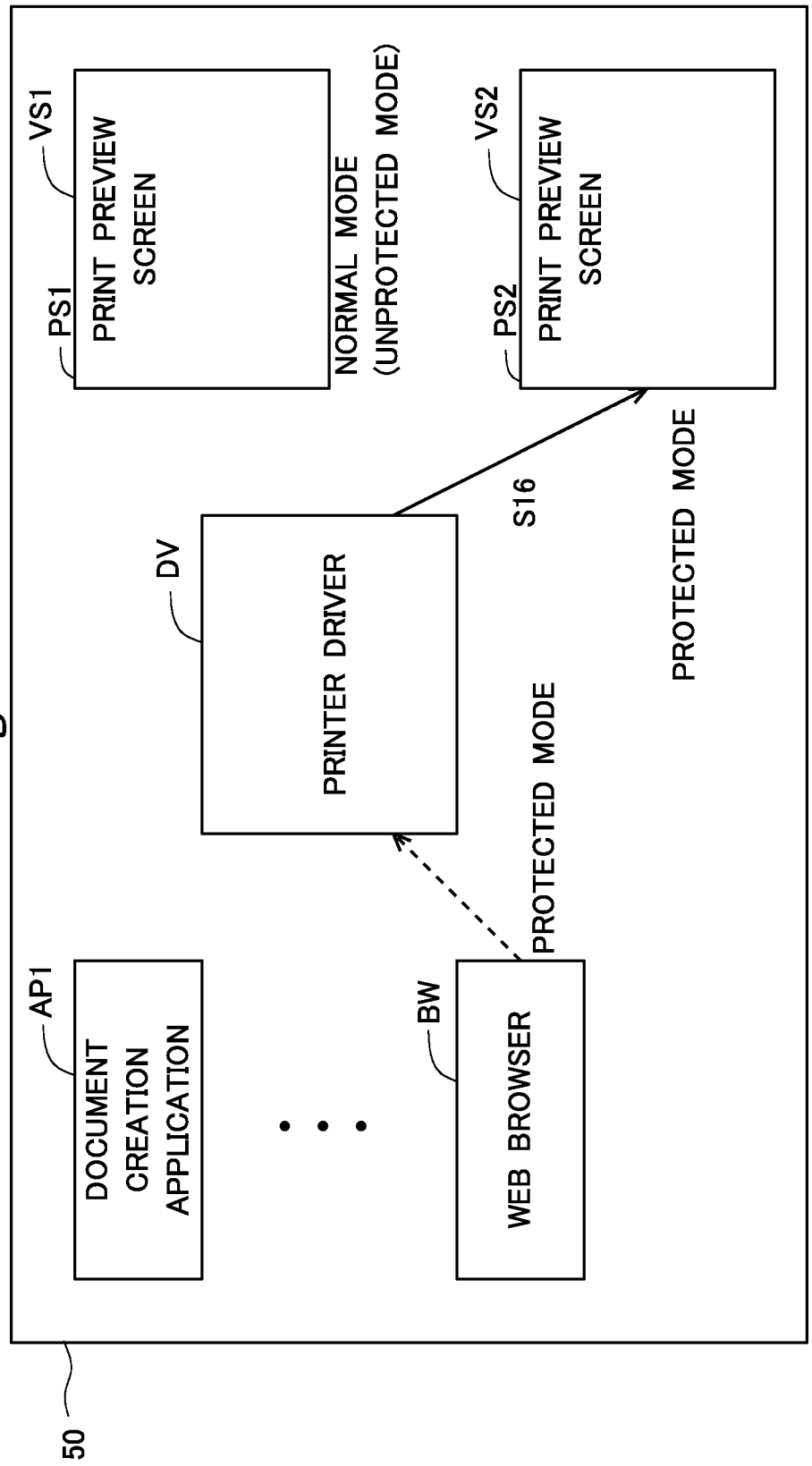
FIG. 7 is a diagram showing the operation and the like of the respective applications.
Figure 8:
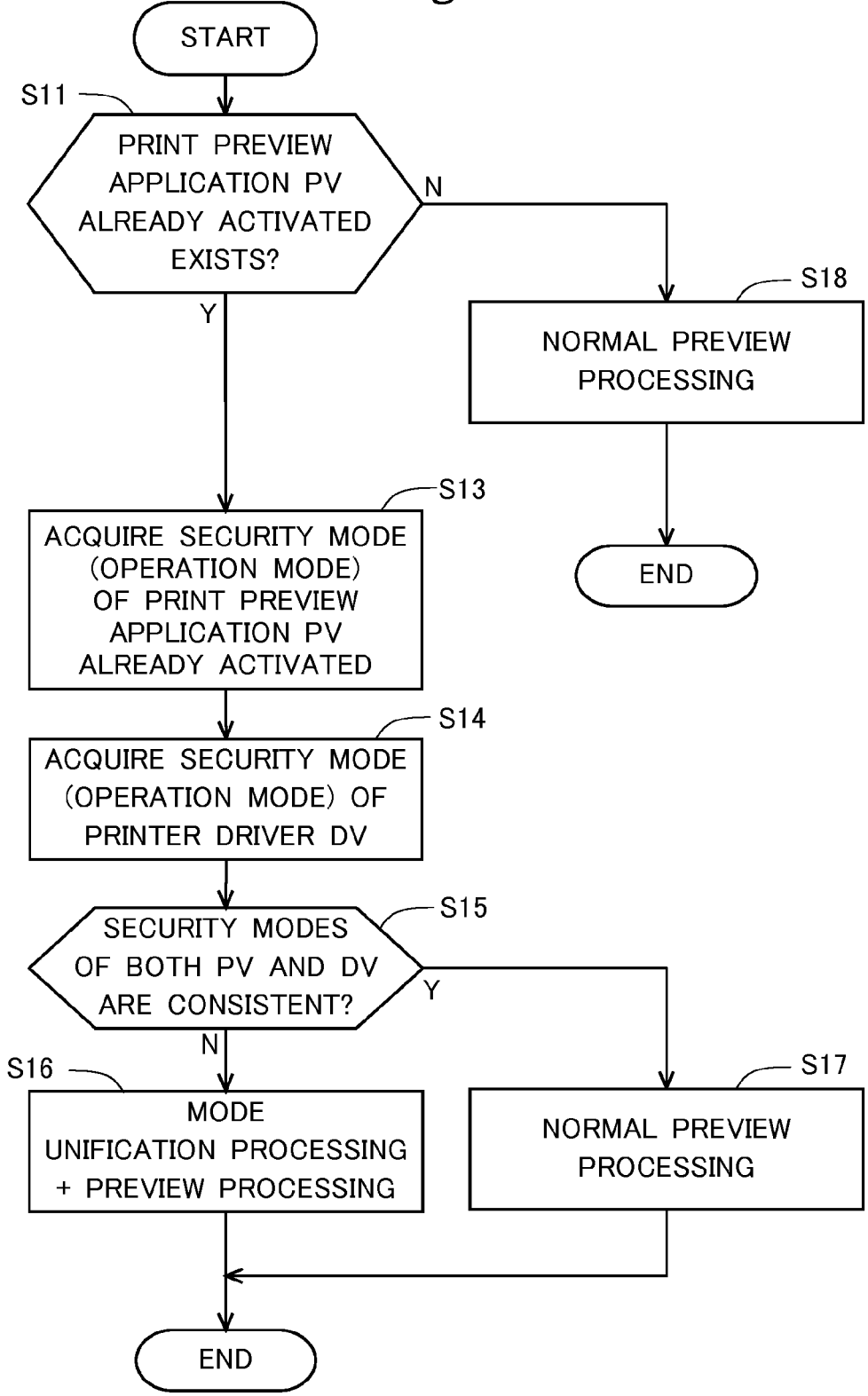
FIG. 8 is a flowchart showing operation of a printer driver.

FIGS. 5 to 7 are diagrams showing operation and the like of the applications. FIG. 8 is a flowchart showing operation of the printer driver DV.

First, when a certain application (in this case, document creation software) AP1 is executed in the normal mode (the unprotected mode) in the computer 50, the print preview application PV is activated through the printer driver DV in response to a print preview instruction from the application AP1, and a print preview screen VS1 is displayed (refer to FIG. 5).

More particularly, when a "print" menu is selected from a main menu of the application AP1 by user operation, the printer driver DV is called from the application AP1, to be activated. The printer driver DV takes over the security mode of the application AP1, to be activated. In this case, the printer driver DV is activated in the "normal mode (the unprotected mode)". The printer driver DV displays a setting screen SG (not shown) on the display unit 56b of the computer 50. When the operator of the computer 50 operates the setting screen SG of the printer driver DV and gives a print preview instruction, the printer driver DV executes the operation in FIG. 8.

In step S11 in FIG. 8, it is determined whether or not the print preview application PV already activated (running) exists. If it is determined that the print preview application PV already activated exists, the processing proceeds to step S13. On the other hand, if it is determined that the print preview application PV already activated does not exist, the processing proceeds to step S18.

In this case, it is assumed that the print preview application PV has not been activated, and that the processing proceeds from step S11 to step S18.

In step S18, normal print preview processing (the normal mode processing) is performed.

At this time point, the print preview application PV is not activated. Thus, the printer driver DV first activates the print preview application PV (particularly, a first execution process PS1 of the print preview application PV). The print preview application PV takes over the security mode of the printer driver DV, to be activated. In this case, the printer driver DV is activated in the "normal mode (the unprotected mode)", and the print preview application PV is also activated in the "normal mode (the unprotected mode)".

Figure 9:
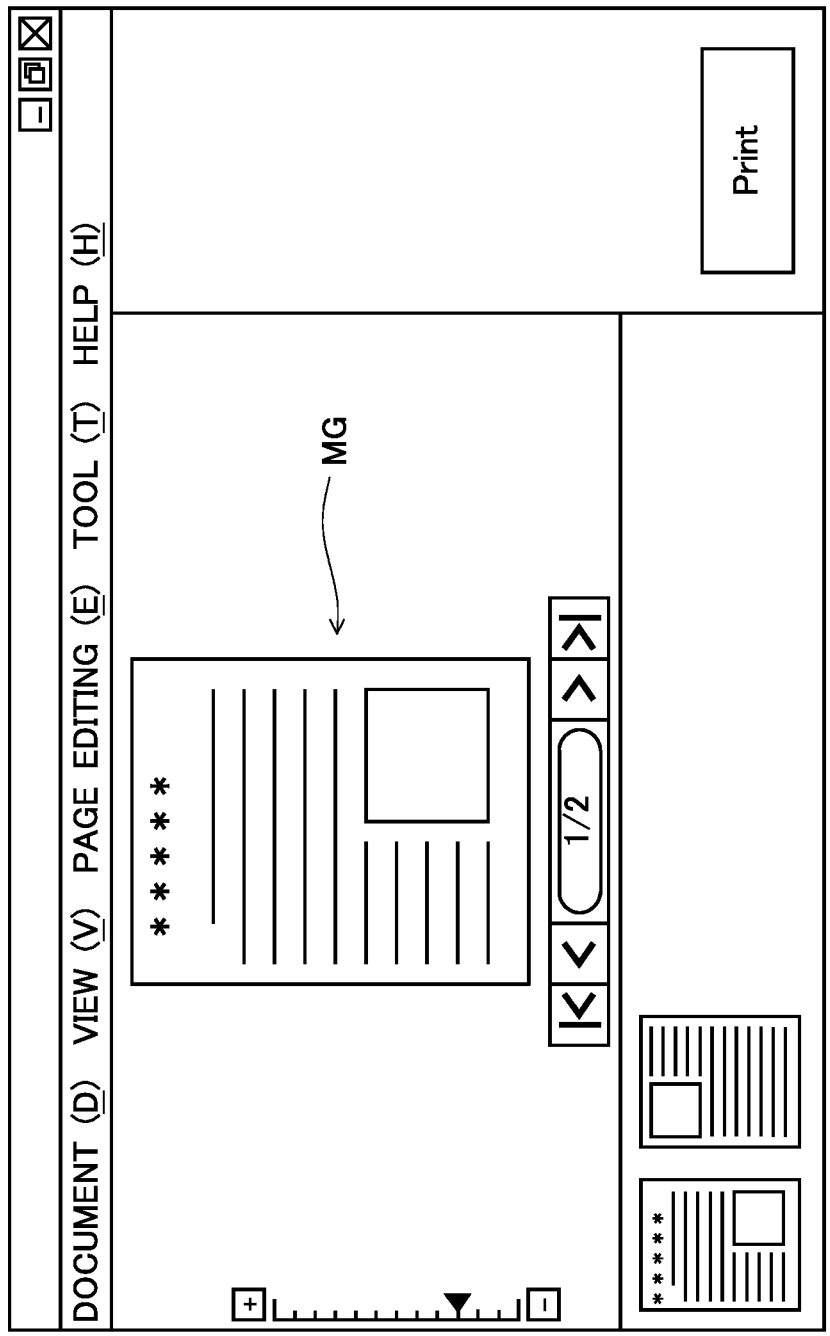
FIG. 9 is a diagram showing a print preview screen.

The printer driver DV transmits data for display of the print preview screen VS1 to the print preview application PV. The print preview application PV displays the print preview screen VS1 (refer to FIGS. 5 and 9) on the display unit 56b of the computer 50, based on the data for display received from the printer driver DV. FIG. 9 is a diagram showing one example of the print preview screen VS1. As shown in FIG. 9, in the print preview screen VS1, a print preview image MG showing a finishing state of a printed matter is displayed.

When the processing in step S18 ends, the processing in FIG. 8 once ends.

Next, a case is assumed where, in a state where the print preview is displayed in the print preview screen VS1 of the print preview application PV, a print preview instruction from another application AP2 (specifically, the web browser BW) is subsequently given to the print preview application PV this time (refer to FIG. 6).

More particularly, a "print" menu is selected from a main menu of the browser BW by user operation, and the printer driver DV from the browser BW is called and activated. The printer driver DV takes over the security mode of the application AP2 (the browser BW), to be activated. For example, if the browser BW is activated in the "protected mode", the printer driver DV is also activated in the "protected mode". That is, when the browser BW is activated in the "protected mode", and the printer driver DV is activated from the browser BW, the printer driver DV activated from the browser BW takes over the security mode (the "protected mode") of the browser BW, and operates in the "protected mode". Moreover, the setting screen SG of the printer driver DV is displayed on the display unit 56b of the computer 50. The operator of the computer 50 operates the setting screen SG to give the print preview instruction.

At this time, in response to the print preview instruction (the display instruction) from the operator, the printer driver DV tries to transmit an operation instruction (the print preview instruction) to display a print preview regarding the browser BW to the print preview application PV already activated (running) (particularly, the running first execution process PS1).

However, when the running print preview application PV operates in the normal security mode (the unprotected mode), inconsistency is caused between the security mode (the unprotected mode) of the running print preview application PV, and the security mode (the protected mode) of the printer driver DV based on the new print preview instruction from the browser BW. Thus, the running print preview application PV cannot normally execute the new operation instruction (the print preview instruction) from the printer driver DV activated in the different security mode. Although displaying the abnormal state in an error message enables the occurrence of the abnormal state to be notified to the operator, the operator is requested for another activation operation of the print preview application PV.

In contrast, in this embodiment, as will be described later, information regarding both modes (MD1, MD2) of the security mode MD1 of the print preview application PV activated by the application AP1 and the security mode MD2 of the printer driver DV activated by the browser BW, which is a different application from the application AP1, is acquired by the printer driver DV.

The printer driver DV determines identity of these two modes MD1, MD2. If both the modes MD1, MD2 are identical to each other, the print preview operation regarding the browser BW is executed using the running first execution process PS1 as it is. On the other hand, if both the modes MD1, MD2 are different from each other, a (new) second execution process PS2 different from the first execution process PS1 is automatically activated, and the print preview processing (particularly, display processing of a print preview screen VS2) is executed using the second execution process PS2 (refer to FIGS. 6 and 7).

Specifically, the processing in FIG. 8 is executed again. In step S11, it is determined that the print preview application PV is running, and the processing proceeds to step S13.

In step S13, a first mode acquiring unit 61 of the printer driver DV acquires, as the precedent set mode MD1, the security mode of the print preview application PV (particularly, the execution process PS1 of the print preview application PV) called from the application AP1 through the printer driver DV (refer to FIG. 6). Information indicating the security mode of the execution process PS1 is stored in a predetermined storage area in the computer 50, and the first mode acquiring unit 61 acquires the information indicating the security mode of the execution process PS1 from the predetermined storage area. Here, the information indicating that the security mode of the execution process PS1 is the "unprotected mode" is acquired.

In this manner, in step S13, the security mode of the execution process PS1 regarding the display application, which has taken over the security mode of the application AP1 and been activated, is acquired as the precedent set mode MD1.

Moreover, in step S14, the second mode acquiring unit 62 acquires, as the new set mode MD2, the security mode of the printer driver DV called from the application AP2 (the browser BW), to be activated (refer to FIG. 6). In other words, the second mode acquiring unit 62 acquires the security mode (the new set mode MD2) of the printer driver DV when the print preview is executed through the printer driver DV, based on the print preview instruction (the display instruction) given in the application AP2 (the browser BW).

In this manner, in step S14, the security mode of the application AP2 is acquired as the new set mode MD2 before the operation instruction (in step S16 or step S17) to execute the display operation in the display application is given, based on the display instruction in the application AP2

Next, in step S15, the determination unit 65 determines the identity of both the modes of the precedent set mode MD1 and the new set mode MD2 (more particularly, a high-and-low relationship of the security level of both the modes).

If both the modes are the unprotected mode, and are identical to each other (if both the modes are consistent), the processing proceeds to step S17. In step S17, the first execution process PS1 regarding the print preview executes the normal print preview under the control of the operation control unit 66. Specifically, based on the facts that the print preview application PV (the first execution process P51) has been already activated, and that both the modes MD1, MD2 are identical to each other, the print preview operation is continued by the print preview application PV (particularly, the first execution process PS1 of the print preview application PV). Specifically, the printer driver DV (the operation control unit 66) called from the browser BW transmits, to the running first execution process PS1, data for display (print preview data regarding the browser BW and the like) (referred to as drawing data as well) of the print preview screen VS2. The print preview application PV displays the print preview screen VS2 on the display unit 56b, based on the data for display received from the printer driver DV.

On the other hand, if both the modes are different from each other (if both the modes are inconsistent), the processing proceeds to step S16. For example, if the precedent set mode MD1 is the "unprotected mode" and the new set mode MD2 is the "protected mode", it is determined that the security level of the new set mode MD2 and the security level of the precedent set mode MD1 are different from each other (particularly, that the new set mode MD2 has the security level higher than the precedent set mode MD1), and the processing proceeds to step S16.

In step S16, the second execution process PS2 different from the first execution process PS1 is additionally activated for the print preview under the control of the operation control unit 66. That is, the new execution process PS2 of the print preview application is additionally activated. The execution process PS2 takes over the security mode (e.g., the protected mode) of the browser BW, to be activated. More particularly, the printer driver DV activated from the browser BW takes over the security mode of the browser BW, to be activated, and further, the print preview application PV activated from the printer driver DV takes over the security mode of the printer driver DV, to be activated. For example, when the browser BW is activated in the "protected mode", the printer driver DV and the print preview application PV are also activated in the "protected mode".

The print preview is executed using the second execution process PS2 under the control of the operation control unit 66. More particularly, the printer driver DV (particularly, the operation control unit 66 thereof) called from the browser BW transmits the data for display of the print preview screen VS2 (the print preview data and the like regarding the browser BW) to the new execution process (the second execution process) PS2. The print preview application PV (the second execution process PS2) displays the print preview screen VS2 on the display unit 56b, based on the data for display received form the printer driver DV (refer to FIG. 7). A window of the second execution process PS2 (the print preview screen VS2) is preferably displayed on the front side with respect to a window of the first execution process PS1 (the print preview screen VS1). Alternatively, the window of the first execution process PS1 (the print preview screen VS1) may be once changed into a non-display state ("minimized and displayed") on the display unit 56b so as not to disturb the display of the print preview screen VS2.

In this manner, if the security levels of both the modes MD1, MD2 are different from each other, in step S16, the new execution process PS2 of the display application is activated and the display operation based on the operation instruction from the printer driver DV is executed using the new execution process PS2.

Here, a drawing process of the printer driver DV based on the preview instruction from the application AP2 (the browser BW) operates in the new set mode MD2 (in this case, in the protected mode). Moreover, the print preview application PV (particularly, the second execution process PS2 thereof) newly activated from the printer driver DV also operates in the new set mode MD2 (in this case, in the protected mode). Accordingly, the security mode of the printer driver DV newly activated from the browser BW, and the security mode of the print preview application PV (particularly, the second execution process PS2 of the print preview application PV) newly activated are identical to each other. As a result, the second execution process PS2 can normally transmit and receive the various types of data (drawing data and the like) with respect to the printer driver DV newly activated from the browser BW, and can normally execute the print preview operation, based on the drawing data and the like. The above-described processing in step S16 is expressed as processing for making identical the security mode of the printer driver DV and the security mode of the print preview application PV, or the like.

According to the above-described operation, when the precedent set mode MD1 of the print preview application PV activated by the application AP1 and the new set mode MD2 of the printer driver DV activated by the application AP2 (the browser BW) are different from each other, the printer driver DV activates the new execution process PS2, to display the print preview using the new execution process PS2. Accordingly, the occurrence of the above-described problem can be avoided, and even if the security modes of a plurality of applications are different from one another, the print preview application (the display application) can be shared properly and easily among the plurality of applications.

In this case, although the aspect is exemplified in which the second execution process PS2 is activated additionally, the present invention is not limited thereto, but the second execution process PS2 may be activated in place of the first execution process PS1. That is, upon ending the first execution process PS1, the new second execution process PS2 may be activated.

<2. Second Embodiment>

In the above-described first embodiment, when the precedent set mode MD1 of the print preview application PV activated by the application AP1, and the new set mode MD2 of the printer driver DV activated by the application AP2 (the browser BW) are different from each other, the aspect is exemplified in which the print preview is displayed using the new execution process PS2. In this second embodiment, when both the modes MD1, MD2 are different from each other, the security mode of the first execution process PS1 is changed, and the print preview is executed using the first execution process PS1 whose security mode is changed.

In the second embodiment, the operation in FIGS. 5 and 6 is executed as in the first embodiment. However, operation in FIG. 11 is performed in place of the operation in FIG. 7.

The operation in FIG. 8 is also executed as in the first embodiment. However, in step S16 in FIG. 8, the processing is different from that in the first embodiment, and the following operation is executed.

Figure 11:
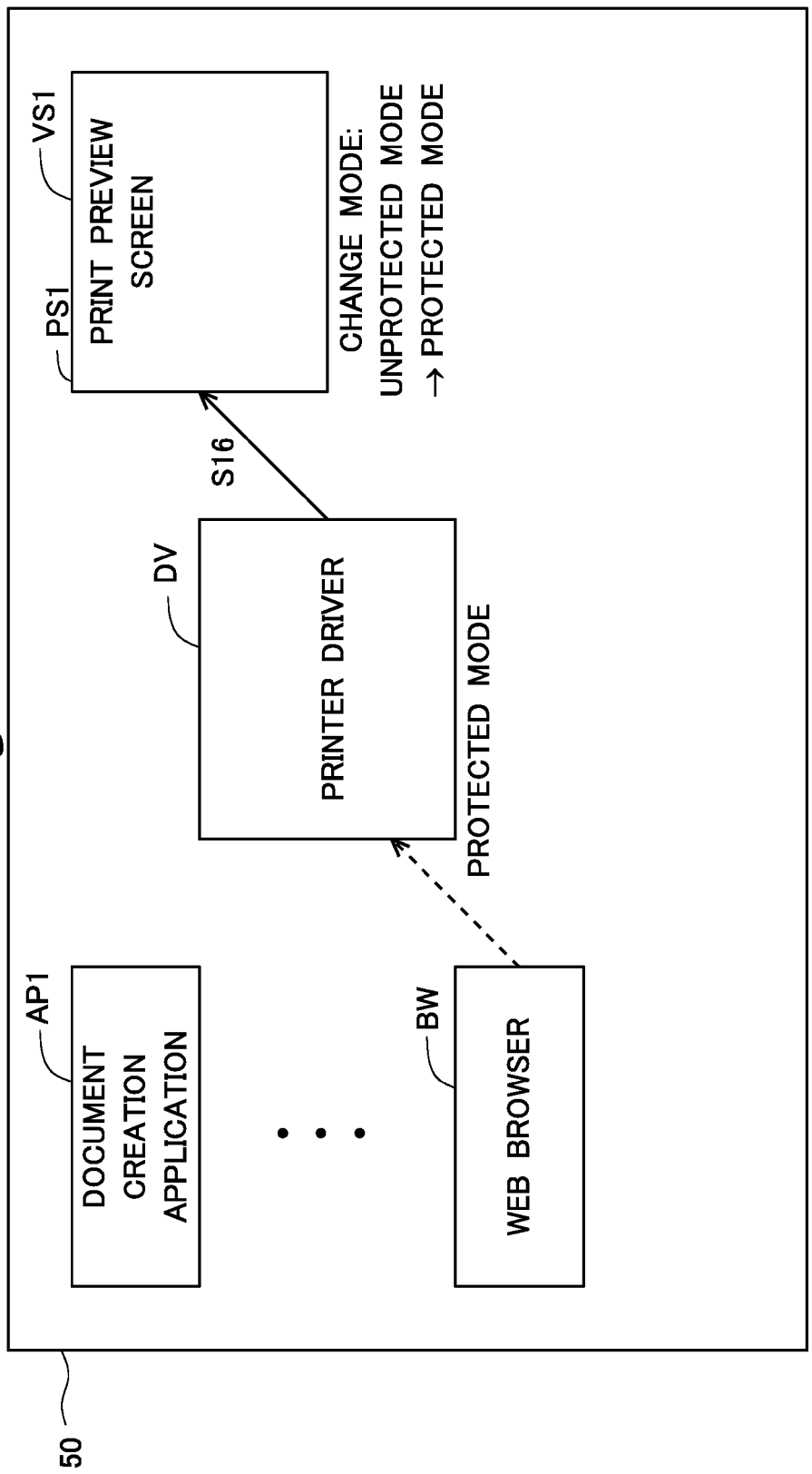
FIG. 11 is a conceptual diagram showing operation according to a second embodiment.

First, the printer driver DV (particularly, the operation control unit 66 thereof) called from the browser BW, to be activated changes the security mode of the first execution process PS1 from the "normal mode (the unprotected mode)" to the "protected mode" (refer to FIG. 11 as well). The operation control unit 66 then executes the print preview using the first execution process PS1 whose security mode is changed to the protected mode.

More particularly, the printer driver DV called from the browser BW (particularly, the operation control unit 66 thereof) transmits the data for display of the print preview screen VS2 (the print preview data regarding the browser BW, or the like) to the first execution process PS1 after the mode change. The print preview application PV (the first execution process PS1) displays the print preview screen VS2 of the browser BW on the display unit 56b, based on the data for display received from the printer driver DV.

At this time, the security mode (the protected mode) of the printer driver DV newly activated from the browser BW, and the security mode of the first execution process PS1 after the change (the protected mode) become identical to each other. As a result, the first execution process PS1 of the print preview application PV can normally transmit and receive the various types of data (the drawing data and the like) with respect to the printer driver DV newly activated from the browser BW, and can normally execute print preview operation, based on the drawing data and the like. The processing in step S16 in FIG. 8 in the second embodiment is also expressed as the processing for making identical the security mode of the printer driver DV and the security mode of the print preview application PV, or the like.

According to the above-described operation, when the precedent set mode MD1 of the print preview application PV activated by the application AP1 and the new set mode MD2 of the printer driver DV activated by the application AP2 (the browser BW) are different from each other, the printer driver DV changes the security mode of the execution process PS1 from the unprotected mode to the protected mode, and the print preview is displayed using the execution process PS1 after the mode change. Accordingly, the occurrence of the above-described problem can be avoided, and even if the security modes of a plurality of the applications are different from one another, the print preview application (the display application) can be shared properly and easily among the plurality of applications.

<3. Modifications and the Like>

In the foregoing, the embodiments of this invention have been described, but this invention is not limited to the above-described embodiments.

For example, in the above-described embodiments, the browser BW as the application operating in the protected mode is exemplified, but the present invention is not limited thereto. The above-described idea may be applied when another application (spreadsheet software or the like) operates in the protected mode. For example, when the print preview instruction is given from the spreadsheet software operating in the protected mode to the print preview application PV activated from document creation software operating in the unprotected mode, the above-described idea may be applied.

Moreover, in the above-described embodiments, the aspect is exemplified in which the print preview application PV is activated in the "unprotected mode" by the application AP1 or the like, and then the print preview instruction from the browser BW operating in the "protected mode" is accepted, but the present invention is not limited thereto. For example, on the contrary, in the case where the print preview application PV is activated in the "protected mode" by the browser BW or the like, and then the print preview instruction from another application AP1 or the like operating in the "unprotected mode" is accepted, the above-described idea may be applied.

More specifically, contrary to the first embodiment, when the print preview application PV (PV2) activated from the application AP2 operates in the "protected mode", the print preview application PV (PV1) operating in the "unprotected mode" may be further activated (aside from the above-described print preview application PV (PV2)), and the print preview processing in response to the print preview instruction from the application AP1 may be executed using the print preview application PV1.

Alternately, contrary to the second embodiment, when the print preview application PV (PV2) activated from the application AP2 operates in the "protected mode", the security mode of the print preview application PV (PV2) is changed from the "protected mode" to the "unprotected mode", and then the print preview processing in response to the print preview instruction from the application AP1 may be executed using the print preview application PV (PV2) after the mode change.

In this manner, when the security mode MD1 of the print preview application PV activated by the application AP, and the security mode MD2 of the printer driver DV activated by the different application AP are different from each other, the processing for matching both the security modes MD1, MD2 may be performed.

Moreover, in the above-described respective embodiments, the print preview application PV is activated from the application program AP through the printer driver DV, and the print preview screen VS is displayed, but the present invention is not limited thereto. Specifically, the display application may be activated directly from the application program AP (not through the printer driver DV), to display an object image (the preview image or the like).

Figure 12:
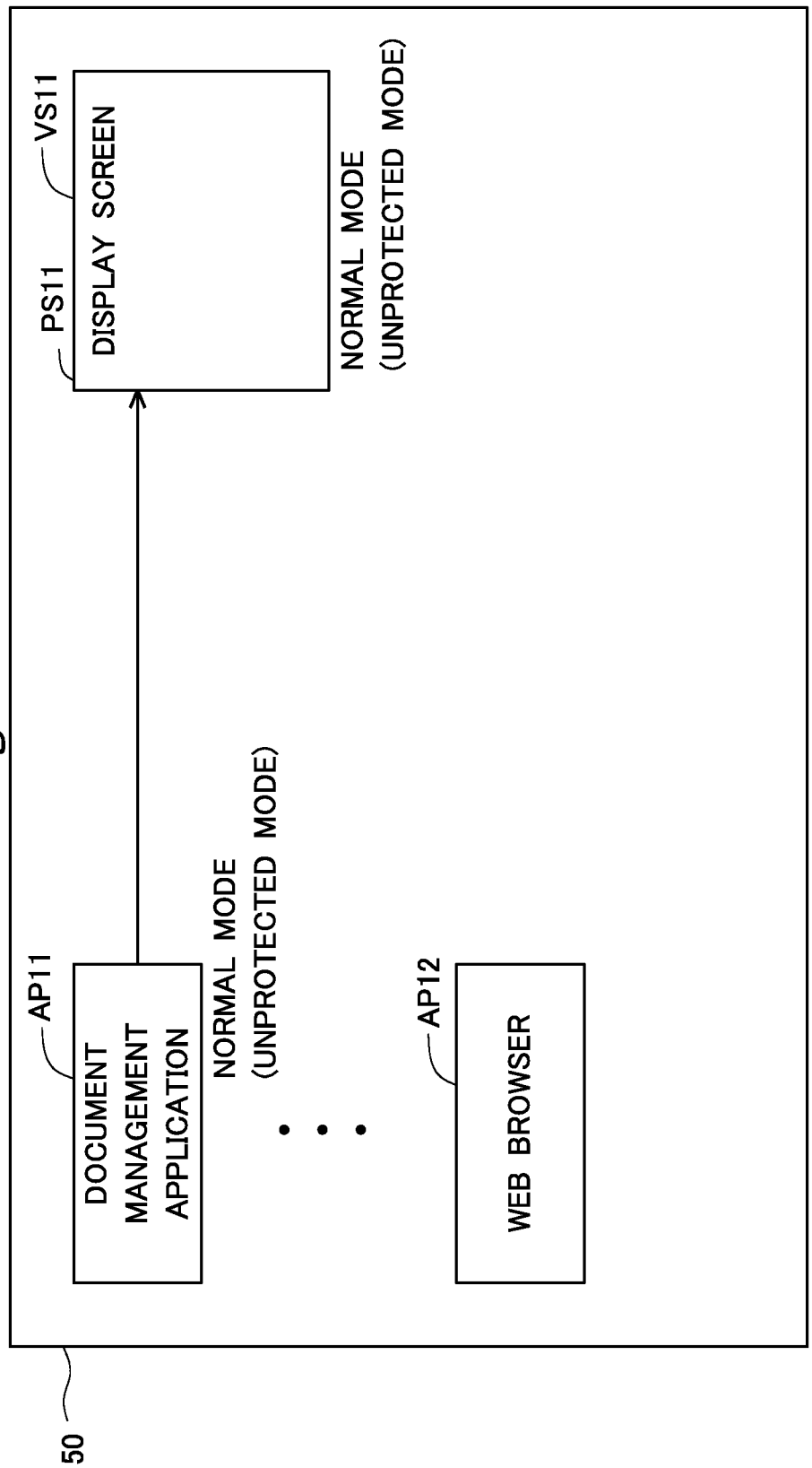
FIG. 12 is a diagram showing operation of a modification.
Figure 13:
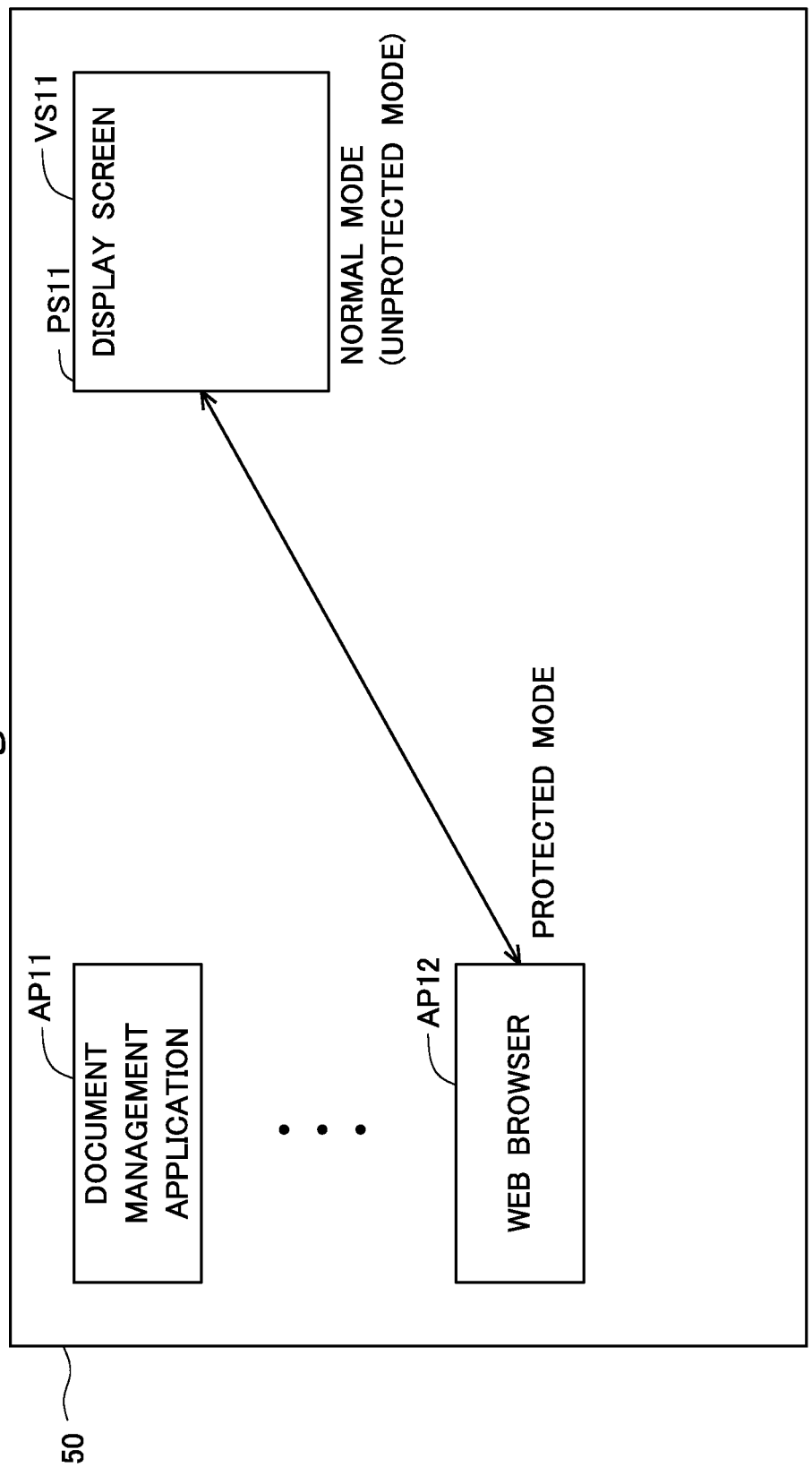
FIG. 13 is a diagram showing the operation of the modification.
Figure 14:
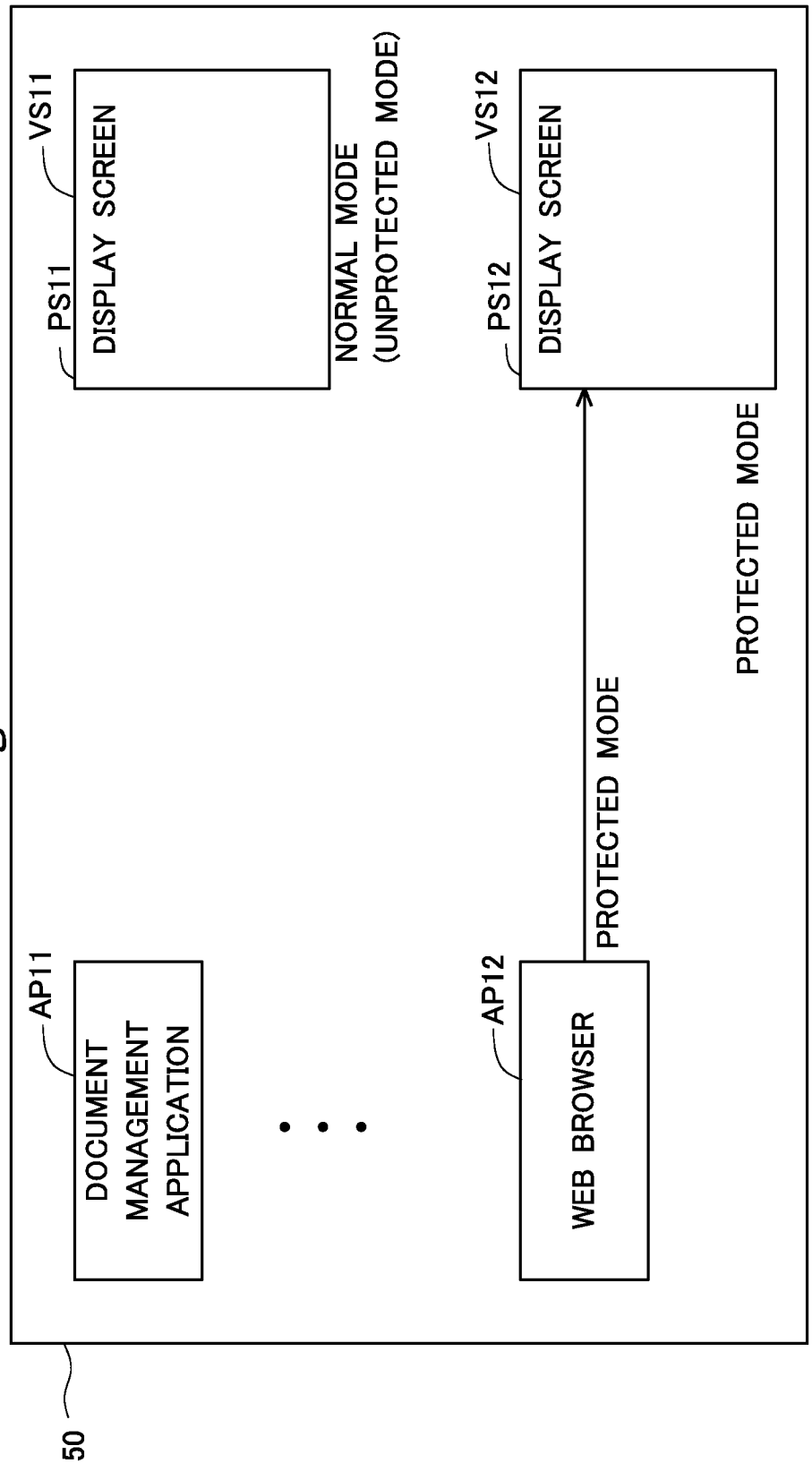
FIG. 14 is a diagram showing the operation of the modification.
Figure 15:
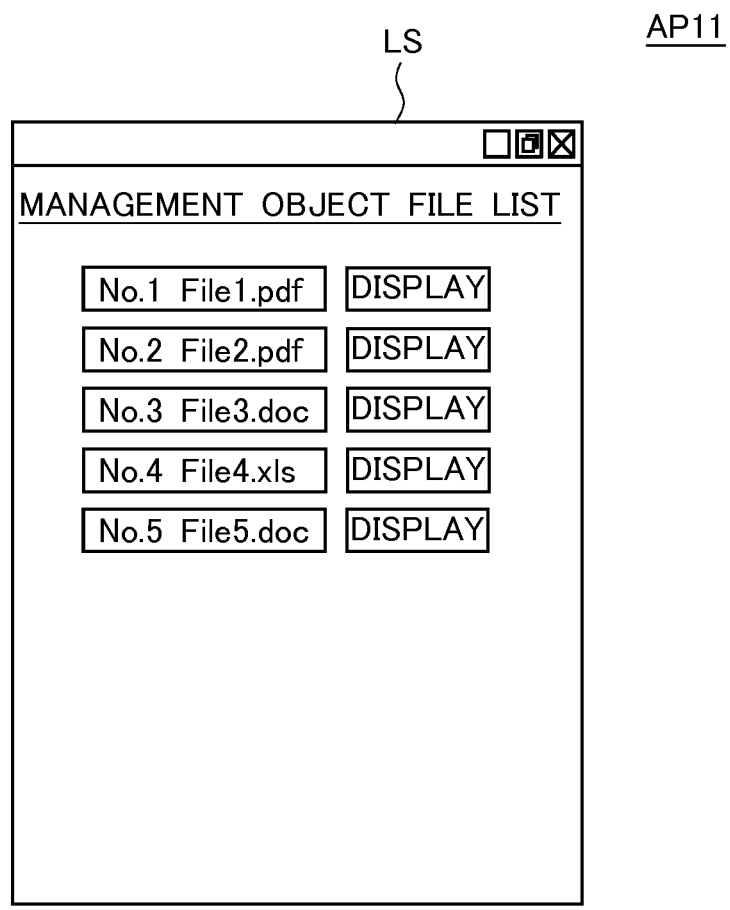
FIG. 15 is a diagram showing a management object file list screen of a document management application.

FIGS. 12 to 14 are conceptual diagrams showing a modification in which the above-described alteration is made to the first embodiment. FIG. 12 corresponds to FIG. 5, FIG. 13 corresponds to FIG. 6, and FIG. 14 corresponds to FIG. 7. Moreover, FIG. 15 is a diagram showing a management object file list screen LS displayed in a document management application AP11 (described next).

The document management application AP11 is an application to comprehensively manage a plurality of documents. A document as a management object is displayed by a document display application DP, which is a different application. Moreover, the document display application DP can be shared among a plurality of applications. For example, the document display application DP can display various documents and the like, based on a display instruction from various applications AP11, AP12.

First, as shown in FIG. 12, when the document management application AP11 is executed in the normal mode (the unprotected mode) in the computer 50, the document display application DP is activated in response to the display instruction from the document management application AP11, and a display screen VS11 is displayed.

More particularly, firstly, a display object document is selected by user operation in the management object file list screen (refer to FIG. 15) of the document management application AP11. More particularly, the display object document is selected in response to press operation to a display instruction button arranged on the right of a desired document among a plurality of documents enumerated in the management object file list screen LS. When the above-described selection operation is performed, the document management application AP11 activates an execution process PS11 of the document display application DP. This execution process PS11 is activated in the "unprotected mode". The document management application AP11 displays the display object document on the display screen VS11, using the execution process PS11.

Thereafter, it is assumed that, in a state where the object document is displayed on the display screen VS11 of the document display application DP, a display instruction from the different application AP12 (e.g., the web browser BW or the like) is subsequently given to the document display application DP this time. The application AP12 operates in the "protected mode".

As shown in FIG. 13, the application AP12 first acquires the security mode (in this case, the "unprotected mode") of the execution process PS11 as the precedent set mode MD1 before an operation instruction to execute display operation is given in the document display application DP, based on the display instruction from the user. Moreover, the application AP12 acquires the security mode of the application AP12 itself (in this case, the "protected mode") as the new set mode MD2.

It is determined that the security levels of both the modes MD1, MD2 are different from each other, and as shown in FIG. 14, the application AP12 activates a new execution process PS12 of the document display application DP, and causes the execution process PS12 to execute the display operation based on the operation instruction from the printer driver DV (FIG. 14).

According to the above-described operation, the security mode of the application AP12 and the security mode of the document display application DP newly activated (particularly, the second execution process PS12 thereof) become identical to each other. Accordingly, the second execution process PS12 can normally transmit and receive the various types of data (drawing data and the like) with respect to the application AP12, and can normally execute the display operation, based on the drawing data and the like.

Here, the modification regarding the first embodiment is exemplified, and a similar modification can also be made to the second embodiment.

While the invention has been shown and described in detail, the foregoing description is in all aspects illustrative and not restrictive. It is therefore understood that numerous modifications and variations can be devised without departing from the scope of the invention.

What is claimed is:

1. An information processing apparatus comprising:
   a display screen; and
   a hardware processor configured to:
   acquire, as a first mode, a security mode of a first execution process regarding a print preview application called from a first application for displaying a first application print preview of the first application on the display screen;
   acquire a security mode of a printer driver as a second mode, while the first application print preview called from the first application is being displayed according the first mode, based on a print preview instruction given in a second application for displaying a second application print preview of the second application on the display screen;
   determine identity of security levels regarding both the modes of the first mode and the second mode; and
   when the security levels of both the modes are the same each other, display the second application print preview of the second application on the display screen using the first execution process of the print preview application, and
   when the security levels of both the modes are different from each other, activate a second execution process which is different from the first execution process and is a new execution process of the print preview application, to execute the print preview instruction and display the second application print preview of the second application on the display screen.

2. The information processing apparatus according to claim 1, wherein
when the second mode has the security level higher than the first mode, the hardware processor activates the second execution process different from the first execution process in response to the print preview instruction, to execute the print preview using the second execution process, at the time of execution of the second application.

3. The information processing apparatus according to claim 1, wherein the second execution process displays the second application print preview in place of the first application print preview on the display screen when the security levels of both the modes are different from each other.

4. The information processing apparatus according to claim 1, wherein the second execution process displays the second application print preview together with the first application print preview on the display screen when the security levels of both the modes are different from each other.

5. A non-transitory computer-readable recording medium having recorded thereon a printer driver, to cause a computer to execute the steps of:
a) acquiring, as a first mode, a security mode of a first execution process regarding a print preview application called from a first application for displaying a first application print preview of the first application on a display screen;
b) acquiring a security mode of the printer driver as a second mode, while the first application print preview called from the first application is being displayed according the first mode, based on a print preview instruction given in a second application for displaying a second application print preview of the second application on the display screen;
c) determining identity of security levels regarding both the modes of the first mode and the second mode;
d) displaying the second application print preview of the second application on the display screen using the first execution process of the print preview application, when the security levels of both the modes are the same each other, and
e) activating a second execution process, which is different from the first execution process, and is a new execution process of the print preview application, to execute the print preview instruction using the second execution process, when the security levels of both the modes are different from each other and displaying the second application print preview of the second application on the display screen.

6. The non-transitory computer-readable recording medium according to claim 5, wherein the second execution process displays the second application print preview in place of the first application print preview on the display screen when the security levels of both the modes are different from each other.

7. The non-transitory computer-readable recording medium according to claim 5, wherein the second execution process displays the second application print preview together with the first application print preview on the display screen when the security levels of both the modes are different from each other.

8. An information processing apparatus comprising:
a hardware processor configured to:

acquire, as a first mode, a security mode of a first execution process regarding a print preview application called from a first application;
acquire a security mode of a printer driver as a second mode, while a print preview called from the first application is being executed according the first mode, based on a print preview instruction given in a second application;
determine identity of security levels regarding both the modes of the first mode and the second mode; and
when the security levels of both the modes are same each other, execute the print preview using the first execution process according to the first mode without changing the security mode of the first execution process, and
when the security levels of both the modes are different from each other, change the security mode of the first execution process of the print preview application from the first mode to the second mode, to execute the print preview using the first execution process according to the different security level of the second mode.

9. The information processing apparatus according to claim 8, wherein
when the second mode has the security level higher than the first mode, the hardware processor changes the security mode of the first execution process to the second mode, to execute the print preview using the first execution process whose security mode is changed to the second mode, at the time of execution of the second application.

10. An information processing apparatus comprising:
a display screen; and
a hardware processor configured to:
acquire, as a first mode, a security mode of a first execution process regarding a display of a first application print preview of a first application on the display screen, and activates display of the first application print preview;
acquire a security mode of a second application print preview of a second application as a second mode, based on a display instruction in the second application;
determine identity of security levels regarding both the modes of the first mode and the second mode; and
when the security levels of both the modes are the same each other, display the second application print preview of the second application on the display screen using the first execution process of the print preview application, and
when the security levels of both the modes are different from each other and the display of the first application print preview is activated, activate a second execution process which is different from the first execution process and is a new execution process to execute a display operation of the second application print preview of the second application on the display screen.

11. The information processing apparatus according to claim 10, wherein the second execution process displays the second application print preview in place of the first application print preview on the display screen when the security levels of both the modes are different from each other.

12. The information processing apparatus according to claim 10, wherein the second execution process displays the second application print preview together with the first application print preview on the display screen when the security levels of both the modes are different from each other.

13. An information processing apparatus comprising:
a hardware processor configured to:

acquire, as a first mode, a security mode of a first execution process regarding a display of a first application, and activates a display operation of the first application;

acquire a security mode of a second application as a second mode, based on a display instruction in the second application;

determine identity of security levels regarding both the modes of the first mode and the second mode; and when the security levels of both the modes are same each other, execute the display operation using the first execution process according to the first mode without changing the security mode of the first execution process, and when the security levels of both the modes are different from each other and the display operation of the first application is activated, change the security mode of the first execution process of the display operation to the second mode, to execute the display operation based on the operation instruction using the first execution process according to the different security level of the second mode.

* * * * *